Figure 1:
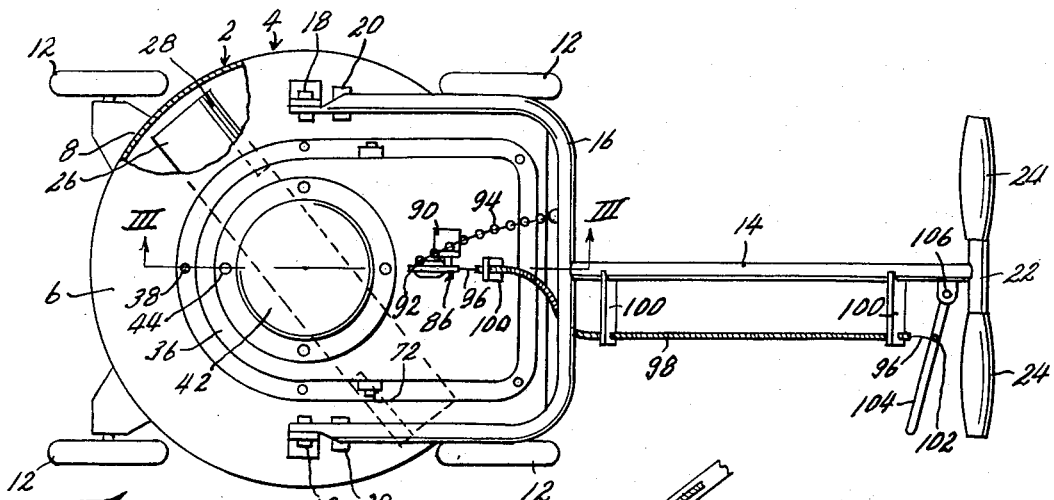

United States Patent [19]
Shriver

[11] 3,871,159
[45] Mar. 18, 1975

[54] SAFETY DEVICE FOR LAWNMOWERS

[76] Inventor: Charles R. Shriver, 2828 N. 67th St., Kansas City, Kans. 66104

[22] Filed: Aug. 17, 1973

[21] Appl. No.: 389,252

[52] U.S. Cl................................. 56/11.3, 56/11.8
[51] Int. Cl............................................ A01d 55/18
[58] Field of Search.................... 56/11.3, 11.8, 255

[56] References Cited
UNITED STATES PATENTS

| | | | |
|---|---|---|---|
| 2,742,750 | 4/1956 | Funk | 56/11.3 |
| 2,985,992 | 5/1961 | Dowdle | 56/11.3 |
| 2,993,329 | 7/1961 | Schmidt | 56/11.8 X |

Primary Examiner—Robert Peshock
Assistant Examiner—J. N. Eskovitz
Attorney, Agent, or Firm—John A. Hamilton

[57] ABSTRACT

In a rotary lawnmower, a clutch operable when engaged to connect the prime mover to the blade to drive it, a brake operable when engaged to resist rotation of the blade, springs normally maintaining the clutch disengaged and the brake engaged, manually operable mechanism operable by a normal grip of the human operator on the handlebar to disengage the brake and engage the clutch, and automatic mechanism operable by raising of the handlebar to render said manually operable mechanism ineffective.

4 Claims, 4 Drawing Figures

PATENTED MAR 18 1975           3,871,159

SAFETY DEVICE FOR LAWNMOWERS

This invention relates to new and useful improvements in lawnmowers, having particular but not necessarily exclusive reference to lawnmowers of the common rotary type, and specifically to the provision of safety means rendering the operation of these machines far safer than has heretofore been possible.

Rotary lawnmowers as here concerned commonly comprise an open-bottomed, wheel supported base housing, beneath which an elongated blade bar is supported in a horizontal plane for rotation about a vertical axis at its midpoint, being driven by a gasoline engine or electric motor mounted on the housing, and, in hand-propelled types, being propelled by a handle bar pivoted for vertical movement to said housing.

The accident rate involving mishaps occurring during use of machines of this type, often resulting in serious bodily injuries, is rather notoriously high. It has been shown that a great majority of these accidents result from two principal general causes. The first of these causes occurs when the operator releases the handlebar for any reason. He may release it accidentally, such as when he stumbles or trips, so that he falls to the ground in the path of the machine, or he may grab at any part of the machine to keep it from coasting down a terrace or the like, and be injured in so doing. If the machine does coast down any incline, there is always the danger that it may strike children or other persons in the area. He may also release the handlebar intentionally, leaving the machine operating and unattended while performing some errand, or even more dangerously, may try to accomplish some adjustment or repair of the machine while it is operating. The second principal cause of accidents apparently has resulted from the vertical pivotability of the handlebar itself. Ordinarily the handlebar is of such length that when gripped by the operator in a normal use position, the operator is positioned far enough from the blade housing to render it extremely unlikely that he could extend his toe or foot beneath the housing edge into the orbit of the blade. However, the handlebar is ordinarily vertically pivotal relative to the housing to permit use of the machine by persons of different heights, to permit different operating angles when pushing the mower up or down slopes, and to permit convenient storage of the mower. Therefore, the operator may in some cases, as when maneuvering the mower in tight quarters, pivot the handlebar upwardly to such an extent that his feet are dangerously close to the blade housing, while still gripping the handlebar firmly, and injury often results.

The principal objects of the present invention, therefore, are the provision of safety means operable to prevent injury in any of the above described circumstances. Included is a clutch operably connecting the prime mover to the blade, with resilient means biasing the clutch to a position of disengagement, and engaged only by operation of a grip safety lever mounted on the handlebar and gripped by the operator as he holds the handlebar, so that the clutch disengages automatically whenever for any reason the operator releases the handlebar. Also included is a brake device operable to be applied to bring the blade to a rapid halt whenever the clutch is disengaged, so that the blade cannot inflict injury during extended periods of "coasting" after being de-clutched. Also included is a mechanical connection between the handlebar and the clutch-brake device, operable whenever the handlebar is pivoted upwardly to a maximum safe elevation either to overrule the grip safety, or to prevent further elevation of the handlebar.

Other objects are simplicity and economy of construction, and efficiency and dependability of operation.

Figure 2:
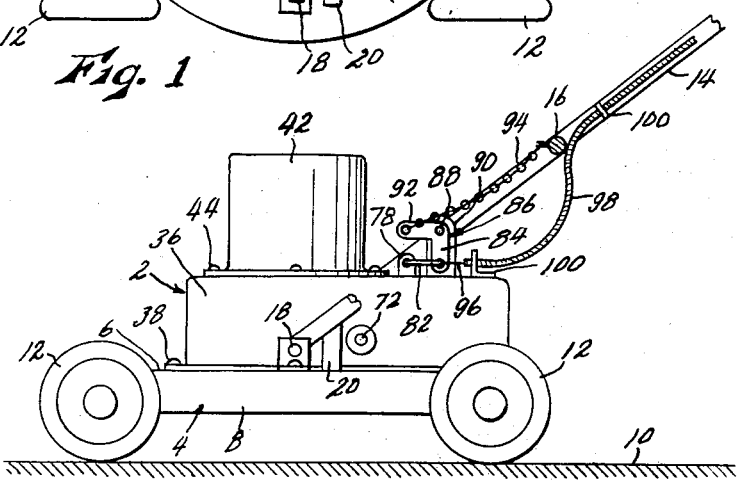
Figures 3, 4:
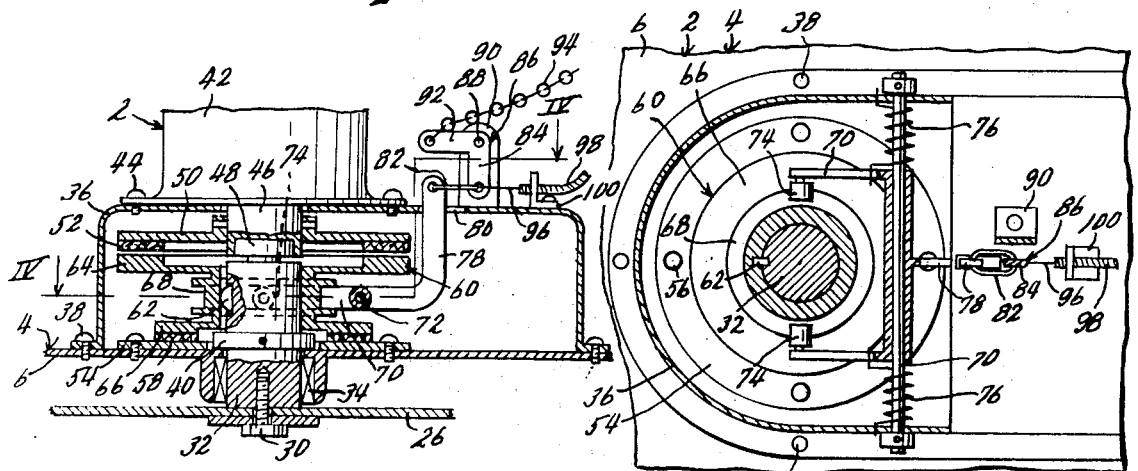

With these objects in view, as well as other objects which will appear in the course of the specification, reference will be had to the accompanying drawing, wherein:

FIG. 1 is a top plan view of a rotary lawnmower including the safety provisions contemplated by the present invention, FIG. 2 is a fragmentary side elevational view of the mower, with parts broken away, FIG. 3 is an enlarged, fragmentary sectional view taken on line III—III of FIG. 1, with parts left in elevation and partially broken away, and FIG. 4 is a fragmentary sectional view taken on line IV—IV of FIG. 3.

Like reference numerals apply to similar parts throughout the several views, and the numeral 2 applies generally to a lawnmower of the rotary type, including a base housing 4 of inverted dish shape, consisting of a horizontal top wall 6 with a depending skirt 8 around its entire periphery. The housing is supported above ground level 10 by ground-engaging wheels 12 carried rotatably thereby. A handlebar 14 is provided at its lower end with a U-shaped yoke 16 the lower ends of which are each pivoted to the top housing wall 6 on a horizontal transverse axis, as at 18. The handlebar extends upwardly and rearwardly, its downward pivotal movement being limited by stops 20 on housing 4, and it is provided at its upper end with a cross bar 22 on which are mounted hand grips 24 which the operator grasps to propel the mower.

An elongated blade bar 26 is disposed horizontally within housing 4, usually about even with the lower edge of skirt 8, and has portions of its longitudinal edges sharpened to form cutting edges 28. Bar 26 is affixed at its midpoint, as by screw 30, to the lower end of a vertical blade shaft 32 which is rotatable in a bearing 34 carried by housing top wall 6. Shaft 32 extends upwardly into an auxiliary housing 36 affixed to the top surface of wall 6 by screws 38, and is prevented from moving downwardly by a bearing collar 40 affixed thereon and engaging the top surface of wall 6. A prime mover 42, which may for example constitute a gasoline engine or an electric motor, is mounted on the top of auxiliary housing 36, as by screws 44, and turns a vertical drive shaft 46 which depends downwardly into the auxiliary housing in coaxial relation with blade shaft 32. The upper end of shaft 32 is reduced in diameter, and engaged in a ball bearing 48 mounted in a socket formed in the lower end of drive shaft 46, whereby the shafts are maintained accurately in alignment, but may rotate relative to each other.

A clutch disc 50 is fixed on drive shaft 46, within the upper portion of housing 36, concentrically with and normally to said shaft, and has an annular disc 52 of friction material affixed to the lower surface thereof. An annular brake disc 54 is affixed as by screws 56 to the upper surface of wall 6, in encircling relation to blade shaft 32, and has an annular disc 58 of friction material affixed to the upper surface therof. A spool member 60 is mounted on blade shaft 32 intermediate clutch disc 50 and brake disc 54, being prevented from rotating relative to said shaft, but permitted to slide axially therealong, by key 62. Said spool member is provided at its upper end with a clutch disc 64 which cooperates with clutch disc 50, and at its lower end with a brake disc 66 which cooperates with brake disc 54. The vertical spacing between the distal faces of discs 64 and 66 is slightly less than the spacing between the confronting faces of the friction facings 52 and 58 of discs 50 and 54. Between discs 64 and 66, spool member 60 is provided with a peripheral groove 68.

Spool member 60 is operable to be raised or lowered slidably on shaft 32 by a yoke 70 pivoted on a shaft 72 which extends horizontally just behind shaft 32, and is journalled at its ends in the side walls of auxiliary housing 36. The arms of said yoke extend forwardly at opposite sides of spool 60, and each carries a roller 74, said rollers being engaged in spool groove 68 at diametrically opposite points thereof, and being rotatable on axes substantially radial to shaft 32. A pair of torsion springs 76 carried on shaft 70 are each engaged at one end in housing 36, and at its opposite end in an arm of yoke 70. Said springs are tensioned to cause said yoke to bias spoole 60 downwardly, whereby cludch disc 64 thereof is moved out of contact with disc 50, and brake disc 66 thereof is urged into engagement with disc 54.

Also affixed to yoke 70 is an operating arm 78 which together with yoke 70, forms a control lever, and which extends first rearwardly from shaft 70, then upwardly through a slot 80 formed in the top wall of auxiliary housing 36, just behind the prime mover 42. At its upper end, operating arm 78 is connected by a rearwardly extending horizontal link 82 to the downwardly extending leg 84 of a bell-crank lever 86 which is pivoted at 88 to a bracket 90 fixed to housing 36. Lever 86 also has a forwardly projecting leg 92, the forward end of which is connected by a chain 94 to a portion of handlebar 14, such as yoke 16 thereof. Said chain is normally slack as shown, but is of such length that it will tighten and pivot lever arm 92 upwardly whenever handlebar 14 has been pivoted upwardly to a predetermined degree.

Also attached to the lower end of vertical leg 84 of lever 86 is a flexible wire 96. The major portion of the length of said wire is contained slidably in a flexible conduit 98 which extends along handlebar 14 to a point adjacent one of the hand grips 24 thereof, being fixed at intervals in brackets 100 affixed to housing 36 and to the handlebar, and having sufficient slack therein to permit vertical movement of the handlebar. Adjacent hand grip 14, wire 96 extends from conduit 98, and is attached at 102 to a grip lever 104 which is pivoted to the handle bar at 106. Wire connection 102 is spaced apart from pivot 106, and lever 104 normally extends in divergent relation to one of hand grips 24, as shown. When the operator grasps the hand grips, he also grips lever 104 with one hand, pulling said lever toward the hand grip.

In operation, it will be seen that the parts will normally assume the position shown in the drawing, with brake discs 54 and 66 engaged, and clutch discs 50 and 64 disengaged, by the biasing force of springs 76. The prime mover 42 may then be started, under a no-load condition. This is an advantage particularly when the prime mover constitutes a gasoline engine, since it permits the engine to be started while the mower is resting in heavy grass or weeds which might otherwise stall or prevent starting of the engine if the blade were coupled directly to the engine at this time. With the present arrangement, the engine may be started and properly warmed up before the blade is coupled to the engine by engagement of the clutch discs. The present arrangement also has the advantage that it does not require the operator to hold lever 104 in a retracted position to permit starting of the prime mover as compared to prior systems in which release of the hand grip safety lever actually disabled the prime mover and prevented starting thereof, as for example by grounding the sparkplug of a gasoline engine or by interrupting the power circuit of an electric motor.

The operator may then start the mower blade in operation by grasping hand grips 24 in a normal position to propel the mower thereby, and in so doing gripping safety lever 104 with the fingers of one hand, his left hand as shown, and drawing it closer to the corresponding grip 24. This retracts control wire 96, which thereupon acts through lever 86, link 82, arm 78 and yoke 70 to elevate spool 60 against the pressure of springs 76. Raising of the spool first disengages brake disc 66 from disc 54, so that blade 26 can turn freely, then engages clutch disc 64 with disc 50, so that the spool is coupled directly to the prime mover, and acts through key 62 to turn blade shaft 32 and blade 26 in a normal manner. The mower can then be operated normally, but only so long as the operator maintains his grasp on lever 104 to keep it retracted. If he releases his grip on this lever for any reason whatsoever, which will occur whenever he releases hand grips 24 either voluntarily or involuntarily, springs 76 will immediately again lower spool 60, first disengaging the clutch discs and then engaging the brake discs, so that while the prime mover remains in operation, the blade itself is brought to a rapid halt to prevent possible infliction of injury thereby.

Furthermore, if the operator should, while maintaining his grip on lever 104 to keep the clutch engaged, attempt to pivot handlebar 14 upwardly on its pivots 18 to such a degree that his feet may be positioned dangerously close to or even inserted under blade housing 4, chain 94 will be drawn taut, and will exert a force on bell-crank lever 86 tending to turn it in a clockwise direction, as viewed in FIGS. 2 and 3, thus exerting a pull on control wire 96 opposite to the force exerted thereon by grip lever 104. This force will either pull lever 104 from the operator's grasp, bringing the mower blade to a halt as just described, or, if he is gripping lever 104 very tightly, will arrest and prevent any further upward pivotal movement of the handlebar, so that as long as he maintains his grasp on lever 104, he cannot extend his feet dangerously close to the blade.

The clutch action only, even in the absence of the braking action, would provide a reasonable degree of safety, since the blade would eventually come to a halt without the brake action. However, the braking action is also highly desirable, since the blade spins at a high speed and is often of substantial mass giving it a high momentum, and is therefore quite capable of inflicting serious injury after it has been declutched, but before it has been brought to a complete stop.

Other advantages of my invention will be readily apparent. For example, various servicing or adjusting operations on mowers of this type often involve manual turning of the blade bar, and if the prime mover is a gasoline engine, such turning may result in accidental starting of the motor and spinning of the blade. The declutching action of the present structure prevents any such occurrence. Such manual turning of the blade may be desired in some operations, however, and can still be performed in the present arrangement despite the braking action. The brake discs are of course frictional in operation, and springs 76 can be tensioned to bring the blade to a rapid halt while still permitting the blade to be turned manually by the application of substantial force thereto. The clutch action is also frictional, and slippage between the clutch discs will occur if the blade, during normal operation, should strike a stone or other solid obstruction. This tends to prevent bending, breaking or other damage to the blade bar, shafts, bearings, and the like, and hence to reduce repair bills resulting from such accidents.

While I have shown and described a specific embodiment of my invention, it will be readily apparent that many minor changes of structure and operation could be made without departing from the spirit of the invention.

What I claim as new and desire to protect by Letters Patent is:

1. In a lawnmower including a base housing, a prime mover mounted on said housing and including a rotatably driven drive shaft, a blade operable to be driven by said prime mover, said blade being carried by a blade shaft mounted rotatably in said housing, coaxially with and below said drive shaft, and propelling means including a handlebar connected to said housing and having a hand grip adapted to be grasped by the operator, safety means comprising:
   a. a first clutch disc fixed on said drive shaft concentrically therewith,
   b. a first brake disc fixed in said housing concentrically with said shafts and spaced below said first clutch disc,
   c. a spool member mounted on said blade shaft between said first clutch and brake discs, said spool member being axially slidable on said blade shaft but restrained against rotation relative thereto, and including at its upper end a second clutch disc engageable with said first clutch disc, and at its lower end a second brake disc engageable with said first brake disc, the spacing between the operative faces of said second clutch and brake discs being less than the spacing between the operative faces of said first clutch and brake discs,
   d. resilient biasing means operable to urge said spool member downwardly whereby said brake discs are engaged and said clutch discs are disengaged, and
   e. manually operable means operable to elevate said spool member against said resilient means whereby said brake discs are disengaged and said clutch discs are engaged, said manually operable means including a grip lever pivotally mounted on said handlebar adjacent said hand grip, said lever being adapted to be engaged and pivoted by the operator with the hand he uses to grasp said hand grip, whereby the lever is released, and the spool member is moved downwardly, whenever the operator releases said hand grip.

2. The structure as recited in claim 1 wherein said resilient biasing means includes a control lever pivoted in said housing and having at one end a connection to said spool member permitting rotation of said spool member, said lever being operable by pivotal movement in a first direction to lower said spool member, and by movement in a second direction to elevate said spool member, and a spring operable to bias said lever in said first direction, said manually operable means being operable to pivot said control lever in said second direction.

3. The structure as recited in claim 2 wherein said handlebar is pivotally connected to said housing for vertical movement, and wherein said manually operable means includes a flexible strand interconnecting said control lever to said hand grip lever, said strand having sufficient slack therein to permit vertical movement of said handlebar.

4. The structure as recited in claim 3 with the addition of a second control lever pivoted to said housing and having one end thereof connected to the end of said flexible strand connected to said first control lever, and operable when pivoted in one direction to apply a tension to said strand opposite to the tension applied thereto by said hand grip lever, and a second flexible strand interconnecting the opposite end of said second control lever to said handlebar, whereby whenever said handlebar is pivoted upwardly to a pre-determined degree, said second flexible strand applies a force tending to pivot said second control lever in said one direction.

* * * * *